Patented Aug. 14, 1928.

1,680,926

UNITED STATES PATENT OFFICE.

KEIZO WOOYENAKA, OF TOKYO, JAPAN, AND TATSUO OKOCHI, OF CLIFTON, NEW JERSEY, ASSIGNORS TO TAKAMINE FERMENT COMPANY, OF NEW YORK, N. Y., A CORPORATION OF VIRGINIA.

PROCESS FOR PRODUCING DIASTATIC PRODUCT.

No Drawing.    Application filed January 9, 1923. Serial No. 611,653.

In Patent No. 1,263,817, issued to Jokichi Takamine April 23, 1918, is described and claimed a process for producing diastatic product in which the diatase-yielding fungi are grown in an apparatus in the nature of a tumbling-drum. Our invention relates in part to an improvement in the process of the patent above referred to.

We have devised a process which in commercial use gives a much greater certainty of yield as compared with prior commercial processes and a product of increased diastatic power. In our process we make use of the same or similar apparatus as that used in the process of said patent, and our improvements consist both in a modified process of growing the spores in the drum and in the process of producing improved seed spores. While improved results may be had by using either part of our invention separately, the best results will be obtained by using the improved seed spores produced according to our invention together with the improved process of producing a diastatic product therefrom.

The improved process of growing the diastatic product will now be described. Sufficient culture medium, which may be in the nature of bran from cereals, is introduced into a drum to a depth of about 3 or 4 feet. This culture medium preferably consists of wheat bran, although other mediums may be employed, as is set forth in Patent No. 1,263,817. If, for example, we start with 3,600 pounds of bran, the same is sprayed with an antiseptic solution, preferably of substantially the following composition:

|  | Pounds. |
|---|---|
| Sodium salicylate | 6.96 |
| Sodium fluoride | 7.56 |
| Water | 630 |

The drum is in motion at a speed of 1 revolution in about 1½ to 2½ minutes when the spraying commences and is continued until the mixing is thoroughly carried out. Steam is now admitted to the drum, while continuing its rotation, for the purpose of sterilizing the medium to destroy such bacilli as may be detrimental or harmful in the production of the fungus. This step of sterilization by steam may continue for about 1½ hours, and may be less if the drum is steam-tight and high-pressure steam is used. Prior to my invention, 4 hours were considered a minimum time in which sterilization could be accomplished using the prior art methods.

Upon completion of sterilization, a current of air, preferably cooled, is passed through the drum in contact with the culture medium; the purpose being to cool the medium down to a temperature best suitable for the subsequent treatment of the fungus. The air used for cooling is preferably cooled and washed and humidified to saturation. When the mass is cooled down to about 55° C., it is sprayed with a solution substantially of the following composition, the drum being kept in motion:

|  | Pounds. |
|---|---|
| Hydrochloric acid 30% | 27.2 |
| Water | 335 |

Equivalent quantities of other inorganic acids such as nitric and phosphoric may be substituted for hydrochloric. When the mass has been cooled down to a temperature approximately 45° C., the introduction of the fungi spores is commenced. Preferably, this is accomplished by spraying on the mass a suspension of the spores in water. As we have previously stated, we prefer to use the improved spores produced according to our invention in a manner to be described, and we take of them in substantially the following proportion:

Spores corresponding to 600 grams of culture medium taken.

Water, 250 pounds.

When the mixing is completed, the mass will have been cooled to a temperature of from 36 to 40° C. At such temperature, the mass is left at rest for about 12 hours.

The drum is then put in motion at a speed of about 1 revolution in from 1½ to 2½ minutes. Next, moist warm air preferably between 30 and 40° C. may be passed through the drum, so as to carry off the carbondioxide evolved as the growth of fungi proceeds. As the temperature gradually rises, the air may be cooled down and its volume increased, so that the temperature of the mass may be kept below 42° C. In case the atmospheric temperature is high and the mass is liable to overheat, a stream of cold water may be run over the shell of the drum. The sign of growth is apparent after 18 hours and the growth is generally completed in about 42 to 48 hours from the time of the inoculation of the spores. The product so produced is known as koji.

The quantities of antiseptics given correspond to 1.7 parts of salicyclic acid and 1 part of hydrofluoric acid for every 1,000 parts of the dry culture medium taken. However, satisfactory results may be obtained when the amount of antiseptics is increased or decreased by 50 per cent of these values.

In addition to the use of differently grown seed spores, the above described process is believed to differ from those of the prior art in the following particulars among others:

(1) The antiseptic is introduced prior to steam treatment, so that a certain amount of antiseptic action is had at the temperature of that treatment. Furthermore, salicyclic acid in introduced in the form of its sodium salt, which is extremely soluble in water, and at the high temperature used, it, as well as the sodium fluoride, is able to penetrate well into the pores of the bran or other medium.

(2) The antiseptics having in this manner thoroughly penetrated the bran substance, they are at a subsequent time and preferably before the introduction of the seed spores, decomposed into the corresponding acids, whose antiseptic action is considerably greater than the salts. It will be observed that salicyclic acid itself is relatively insoluble in water. Furthermore, both salicyclic and hydrofluoric acids are to some extent volatile in steam, and were they present as such during the steam treatment, a considerable loss in these substances would result. In case the antiseptics mentioned are present in acid form, they are believed also to be rendered ineffective for the following reasons: There is present in the bran considerable protein material which, as is well known, comprises among other classes of compounds various nitrogen and other bases in various states of combination and long experimentation has indicated that at sterilization temperatures it is very probable that combination of these bases and the antiseptics in the form of free acids take place, thereby effectively destroying the activity of the latter as bactericides.

(3) The mass is in a highly antiseptic condition and is maintained in that condition when the cool air is introduced, thereby preventing contamination from this source.

(4) The antiseptics are introduced in a larger proportion of the total amount of water added, thus enabling them to more thoroughly penetrate the bran particles.

We have found that superior results are obtained when using seed spores prepared according to the following process, which forms a part of our invention. We take, for example, 200 grams of the branny portions of cereals, say, bran of wheat, and thoroughly mix therewith 50 c. c. of a solution in which about 2.32 to 4.64 grams of sodium salicylate (equivalent to about 2 to 4 grams salicyclic acid) were dissolved. The moistened mass is put into a suitable vessel; for example, a wide-mouthed bottle of approximately 1 gallon capacity, whose opening is covered with a layer of 2 or 3 sheets of Swedish filter paper and over which a piece of thick flannel is placed. The covers are tied around the neck by means of a cord and the bottle sterilized in an autoclave by steam at about 15 pounds pressure for about 1 hour. It is then taken out and cooled. Then 50 c. c. of hydrochloric acid in sterilized water containing about 14.5 c. c. of the normal acid is carefully introduced into the bottle, avoiding any possible admittance of germ-laden dust. The bottle is then vigorously shaken, so as thoroughly to distribute the introduced liquid in the mass. The hydrochloric acid thus added will liberate salicyclic acid from the sodium salicylate. The spores of aspergillus oryzae are introduced and thoroughly mixed with the contents of the bottle, the medium being spread on the sides thereof. It is then left for a week or more at a temperature ranging between 30° to 33° C. The fungi grow and propagate throughout the whole mass and spore-bearing will be accomplished within that time. The mass is now thoroughly covered with fungi-laden spores and presents a greenish yellow appearance. The spores are now ready for use.

If it is desired to preserve the seed spores for a length of time, the entire contents of the bottle may be transferred into a paper bag made aseptic by known means and dried in a current of air not warmer than 50° C. In dry state, the spores may be kept from 2 to 3 years without appreciable loss of vitality.

When the spores thus produced are to be used immediately the mass as obtained above is suspended in sterilized water and the spores separated from the culture medium by means of a suitable strainer; also previously sterilized. The suspension of spores is then ready to be introduced into the culture medium by spraying or in any manner desired.

The salicyclic acid may be added to the culture medium in the bottle directly in hot water and the subsequent use of the hydrochloric acid dispensed with, but in this case some of the antiseptic may be lost through volatilization and thorough penetration of the bran substance by the antiseptic may not be had. Benzoic acid may be used instead of salicyclic, but with less satisfactory results, since benzoic acid has a considerably more toxic effect upon the fungus.

We believe that our process of spore-growing is distinguished from processes heretofore known, in that a much greater amount of antiseptic is used than had previously been considered to be the practical maximum. Furthermore, the antiseptic is introduced into the culture medium before the step of steam sterilization, and in a much more soluble form. In this form it is enabled to penetrate thoroughly the bran substance and the latter is thereby exposed to its increased action at the temperature of sterilization.

By using the improved seed spores in the process above described a final product superior to any such product heretofore commercially produced is obtained. As tested by the Lintner method, the diastatic strength of our final product will be from 6,000 to 12,000 per cent, which is about 100% stronger than any product heretofore commercially produced. It is at present considered that ideal conditions are obtained when the yield of diastatic substance amounts to 1.5 to 3.0% in weight of the material employed. The success of the process, however, is measured not by the yield alone but by the yield plus the diastatic strength of the product. In processes as heretofore generally used the yield varied inversely as the diastatic strength, but by the use of our process we obtain a product of approximately twice the diastatic strength of the product by prior processes and at the same time the yield remains within the limits above mentioned. Furthermore in processes as heretofore practiced failure was experienced more often than success, so that the outcome of the operation could not be depended upon. By the use of our process, success is had in every instance and may therefore be depended upon. Our process therefore not only succeeds in every instance, but produces a product much stronger than the product heretofore produced under what was heretofore considered to be the best conditions.

Having obtained the koji as above described, the soluble enzyme material may be extracted in the known manner to produce a final product.

While our invention has been described in detail and exact quantities given, it will be understood that such description is by way of illustration, and that the exact procedure and quantities given may be varied without departing from the spirit of our invention.

We claim:—

1. The process of manufacturing diastatic product, which consists in impregnating a culture medium that is suitable for growing fungi with an aqueous solution of sodium salicylate and sodium fluoride in a closed receptacle, steaming the medium to effect sterilization thereof, liberating the acid radicals of said antiseptics by adding a dilute mineral acid, inoculating the mass with aspergillus oryzae spores and subjecting same to incubating conditions.

2. In the process of producing diastatic product, the steps which consist in impregnating a culture medium that is suitable for growing fungi with an antiseptic acid radical in the form of a water soluble salt thereof, steam sterilizing said medium, liberating said antiseptic radical by adding a dilute mineral acid thereto, inoculating the medium with aspergillus oryzae spores and subjecting same to incubating conditions.

3. The process of growing diastatic spores which consists in adding a solution of sodium salicylate to a culture medium that is suitable for growing fungi in a closed receptacle, subjecting same to heat sterilizing conditions adding a dilute mineral acid solution, inoculating with aspergillus oryzae spores and subjecting the mass to incubating conditions.

4. The process of manufacturing diastatic product, which consists in adding a salt of salicylic acid to a culture medium that is suitable for growing fungi in sterilizing same by means of steam, cooling the medium, adding a dilute mineral acid to the same, sowing aspergillus oryzae spores on the medium, and then subjecting the medium to incubating conditions, all of said steps being performed while the medium is subjected to agitation.

KEIZO WOOYENAKA.
TATSUO OKOCHI.